United States Patent [19]

Nashimoto et al.

[11] Patent Number: 4,577,917

[45] Date of Patent: Mar. 25, 1986

[54] COUPLER CONNECTING DEVICE

[75] Inventors: Ryo Nashimoto, Tokyo; Shoji Motodate, Saitama, both of Japan

[73] Assignee: Honda Giken Kogyo Kabushiki Kaisha, Tokyo, Japan

[21] Appl. No.: 709,350

[22] Filed: Mar. 6, 1985

Related U.S. Application Data

[63] Continuation of Ser. No. 452,007, Dec. 21, 1982, abandoned.

[30] Foreign Application Priority Data

Dec. 25, 1981 [JP] Japan ................ 56-209030

[51] Int. Cl.$^4$ ............ H01R 9/28; H01R 13/50; H01R 13/64
[52] U.S. Cl. ................ 339/150 T; 339/10; 339/147 R; 339/176 M; 339/186 M; 339/198 R
[58] Field of Search ............ 339/10, 18 R, 18 B, 339/18 P, 126 R, 147 R, 150 T, 176 M, 184 M, 186 M, 198 R, 198 G, 198 GA, 198 K, 198 P, 198 E, 198 J; 180/219

[56] References Cited

U.S. PATENT DOCUMENTS 4,429,943  2/1984  Inoue ................ 339/198 R

FOREIGN PATENT DOCUMENTS 1032895  6/1966  United Kingdom ............ 339/126 R
1194772  6/1970  United Kingdom ............ 339/147 R Primary Examiner—Gil Weidenfeld
Assistant Examiner—Steven C. Bishop
Attorney, Agent, or Firm—Sughrue, Mion, Zinn, Macpeak, and Seas

[57] ABSTRACT

A coupler device for use in a motorcycle or the like serves to centralize electrical connections previously achieved through a plurality of independent couplers. The device allows more freedom in the design of the headlight, which formerly housed electrical couplings, and also permits the centralization of other electrical components, such as fuses. The device may be mounted in a previously dead-space on the vehicle, leading to design efficiency and a better external appearance of the bike.

4 Claims, 27 Drawing Figures

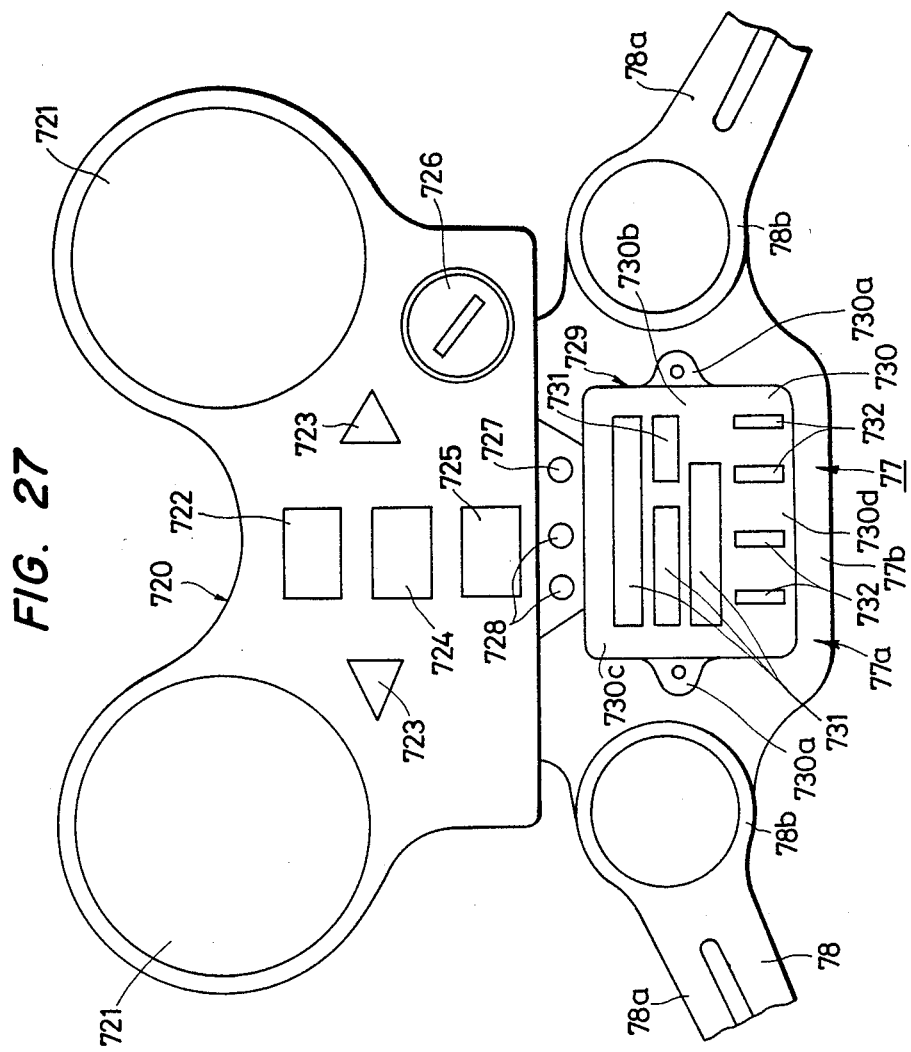

COUPLER CONNECTING DEVICE

This is a continuation of application Ser. No. 452,007, filed Dec. 21, 1982, now abandoned.

BACKGROUND OF THE INVENTION

In a motorcycle or the like, various couplers are connected to the wires through which electrical components are connected, as shown in FIG. 1. In repairing or replacing the electrical components, the couplers are separated into two parts.

Therefore, in order to prevent the erroneous joining of a mismatched pair of couplers, it is necessary to provide a number of couplers of different dimensions and sizes. With advanced automation, the number of electrical components employed is increased and the number of types of couplers needed is also increased; that is, the cost of vehicle wiring is increased.

In the conventional method, one coupler is required for each electrical component. Therefore, as the number of electrical components used is increased, the number of wires and couplers to be used is increased, and accordingly time and labor are unavoidably increased.

This invention also relates to a device for wiring electrical elements at the front of a motorcycle or the like.

A head light unit, a blinker unit, a horn and a meter unit are installed at the front of a motorcycle. These electrical devices require electrical wiring. While the electrical devices are at the front of the bike, the battery is installed, for instance, at the middle thereof. Since the electrical device must be connected through harnesses to the battery, it is necessary to use a number of harnesses, and the wiring of the electrical devices is unavoidably intricate. Even if a concentrated harness is extended to near the electrical devices, it is necessary to extend the wires of the harness to the electrical devices, and accordingly wiring around the handlebar is rather complicated. As switches for the above-described electrical devices are provided on the handlebar, it is necessary to connect the switches to the respective electrical devices using the harness or harnesses. As the harnesses are connected by means of couplers, the wiring is more complicated. Thus, the conventional method is not desirable with respect to external appearance or harness installation.

In order to overcome the above-described drawbacks, a method has been proposed in which couplers are collectively arranged, so that harnesses can be collectively connected. In the conventional method, couplers are arranged collectively in the head light casing. That is, the method utilizes the space in the head light casing. Accordingly, the external appearance and design of the head light casing are limited. Thus, the conventional method is not preferable in that the degree of freedom in selecting the design of the head light, which is one of the important factors determining the external appearance of the motor bicycle, is limited. Furthermore, the wires of the various devices such as the speedometer, tachometer, sensors, blinker display elements and other display elements in the meter unit are led into the head light casing, and more wires are led out of the head light casing. Thus, it has been required to improve the conventional method from the point of view of the external appearance.

Additionally, a number of fuses are normally employed, inserted in the circuits of the electrical devices, and are provided for the electrical devices, respectively. Irregular arrangement of these fuses is disadvantageous in maintenance. The fuses should be arranged collectively. In addition, in cases where it is necessary to provide electrical elements such as blinker relays, diodes and ICs in addition to the fuses, a collective arrangement of them is desirable from a maintenance standpoint.

SUMMARY OF THE INVENTION

This invention relates to a coupler connecting device in which the above-described difficulties have been eliminated, and which is intended to provide a compact coupler connecting device with which vehicle wiring can be readily correctly achieved.

Another object of this invention is to provide a device for wiring electrical elements on a motorcycle or the like, in which couplers are collectively arranged behind a horn unit, or on the rear surface of a meter unit, which is opposite to the display surface thereof and directed towards the front of the vehicle body, harnesses from various electrical elements being collectively connected to the couplers, and the couplers being surrounded by a cover, whereby the couplers are reasonably collectively arranged and protected from entrance of water or rain, and the installation and maintenance of the couplers are improved.

A further object is to provide a device for wiring electrical devices on the front of a motorcycle or the like, in which a concentrated coupler is installed on the top bridge of the motorcycle, sockets are arranged on the front of the substrate of the concentrated coupler while electrical elements such as fuses, relays, diodes and ICs are arranged on the rear of the substrate so that the space above the top bridge adjacent to the electrical devices on the front of the motor bicycle or the like is effectively utilized for reasonable wiring, thus improving maintenance, the electrical elements are arranged at the rear of the concentrated coupler so as to be free from the wiring for better maintenance, and in which these electrical elements together with the coupler are collectively arranged, so that installation and maintenance of the electrical wiring and electrical elements are reasonably achieved.

BRIEF DESCRIPTION OF THE DRAWINGS

FIG. 27 is a plan view showing the essential components of the same.

DETAILED DESCRIPTION OF THE PREFERRED EMBODIMENTS

Figure 1:
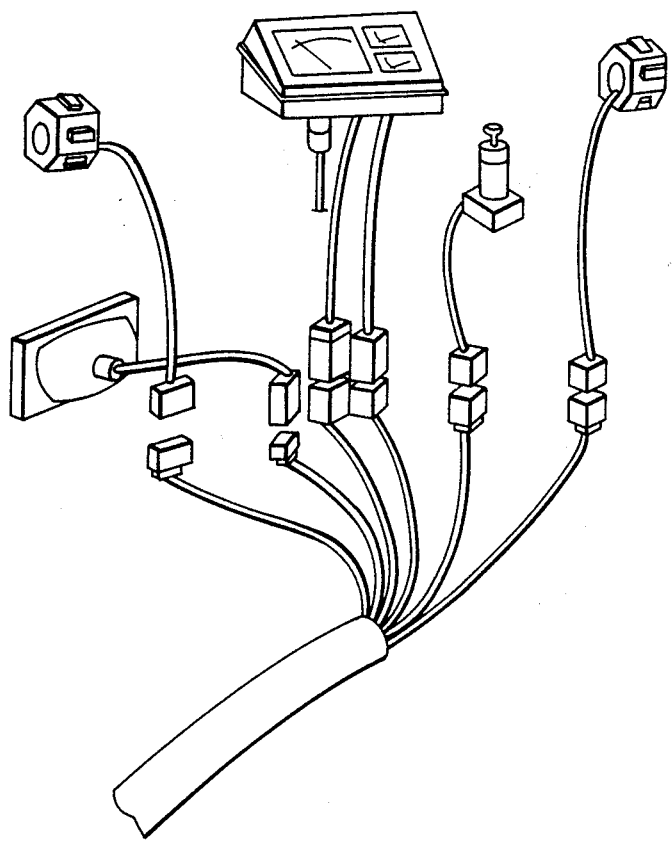
FIG. 1 is a perspective view outlining the conventional connection of electrical components.
Figure 2:
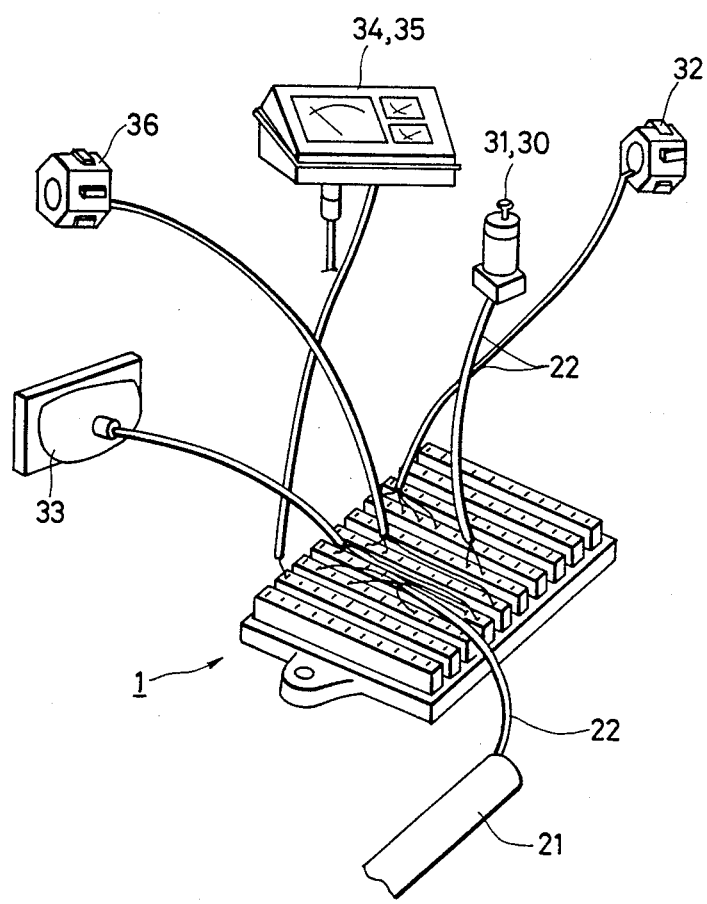
FIG. 2 is a perspective view outlining one example of a coupler connecting device according to this invention.
Figure 3:
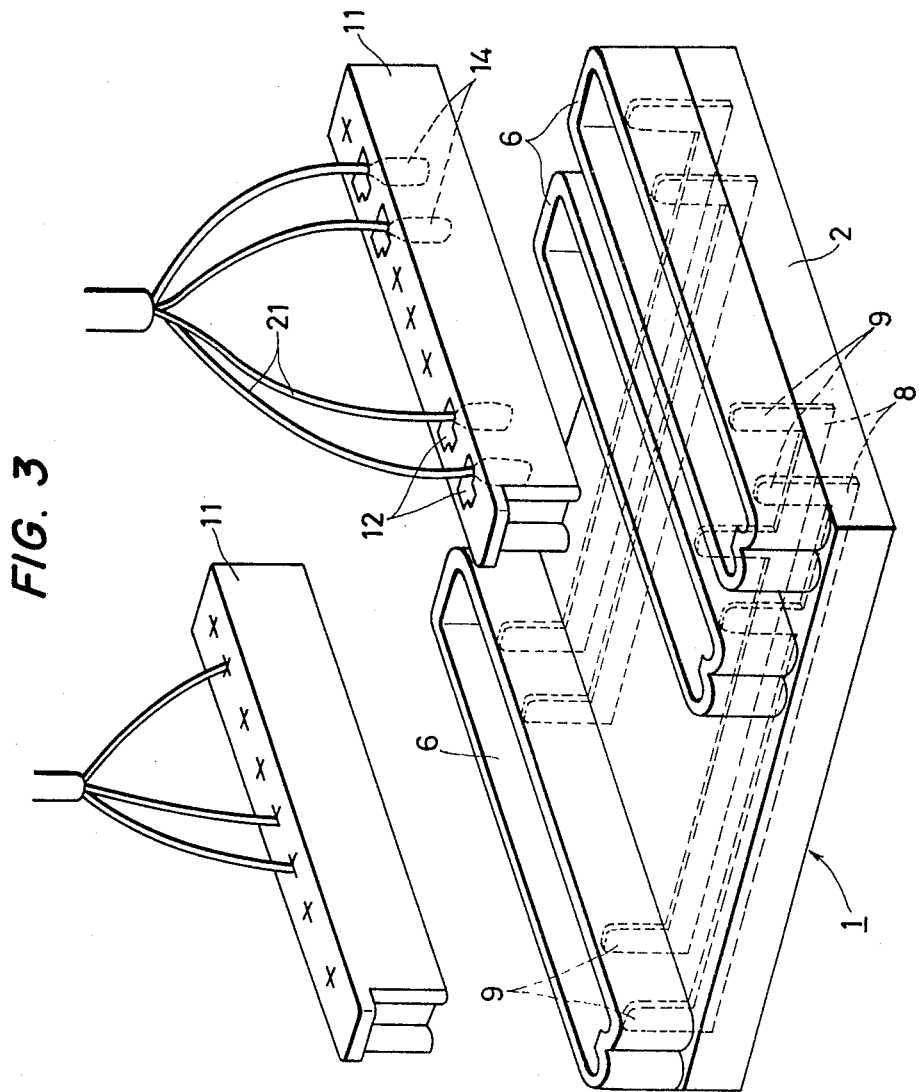
FIG. 3 is a perspective view showing the essential components of the coupler connecting device.
Figure 4:
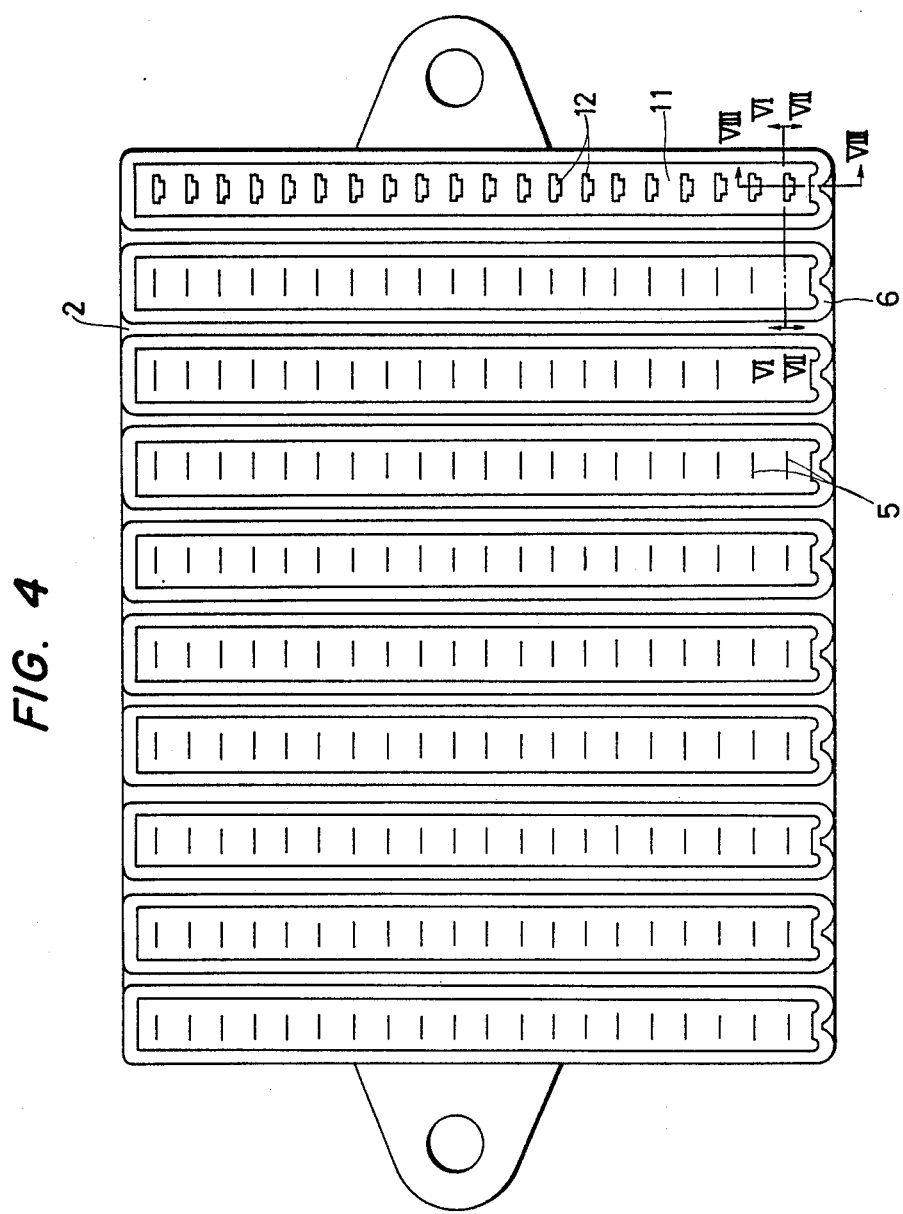
FIG. 4 is a plan view of a substrate of the device of the invention.
Figure 5:
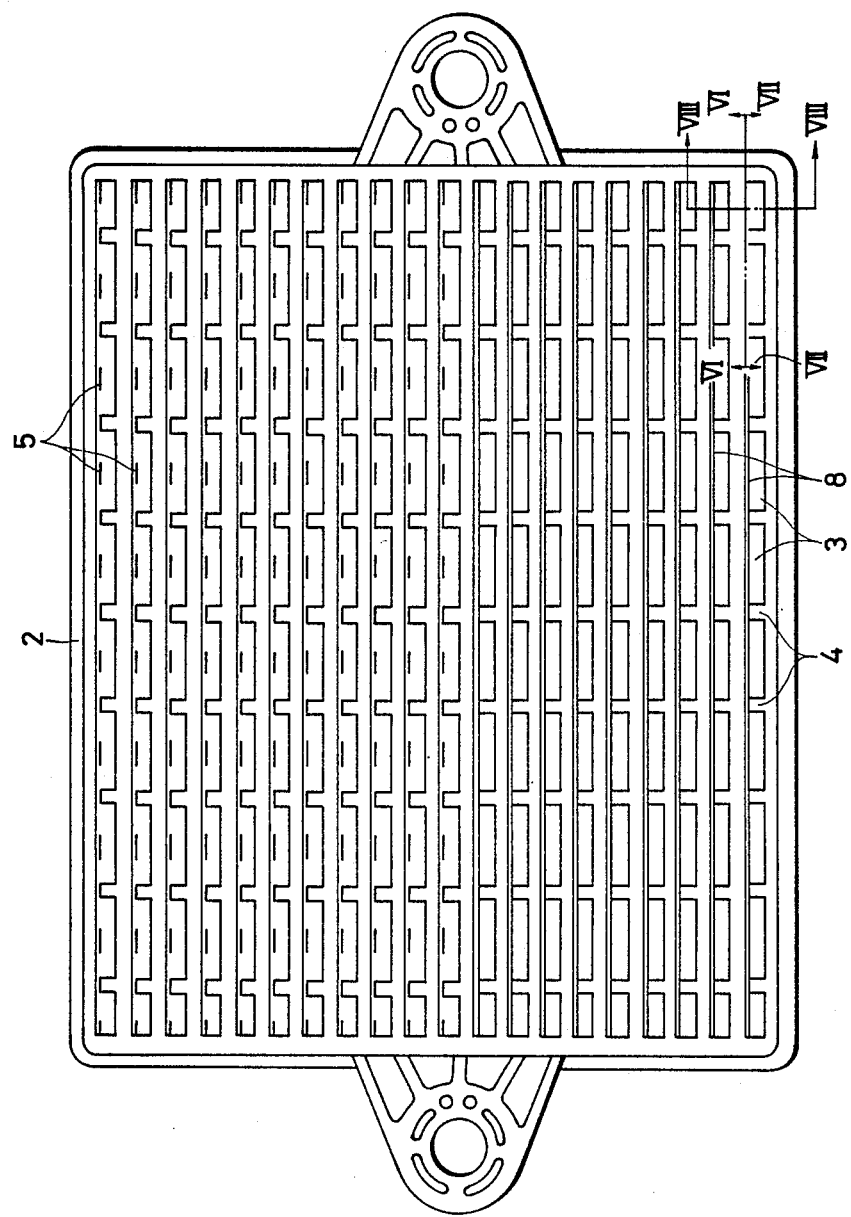
FIG. 5 is a bottom view of the substrate.
Figure 6:
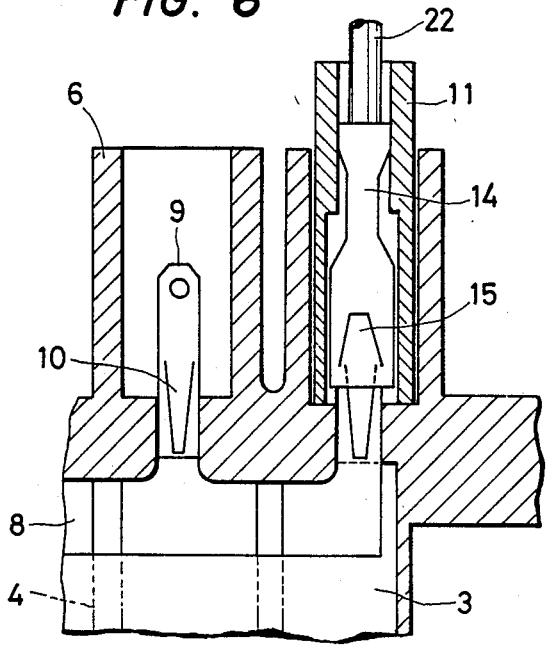
FIGS. 6, 7 and 8 are sectional views taken along lines VI—VI, VII—VIII and VIII—VIII in FIGS. 4 and 5, respectively.
Figure 7:
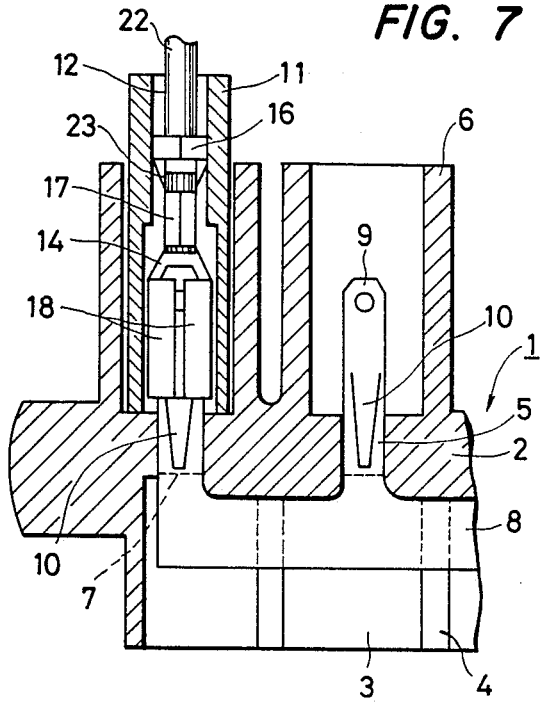
Figure 8:
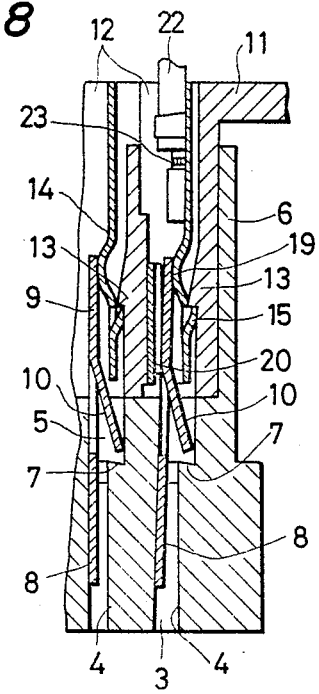
Figure 12:
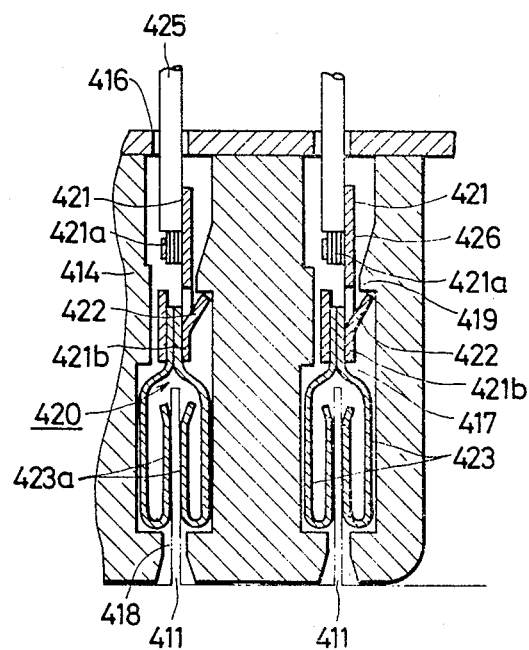
FIG. 12 is an enlarged sectional view taken along line XII—XII of FIG. 11, showing essential components.

One embodiment of this invention will be described with reference to FIGS. 2 through 9.

Referring to these figures, reference numeral 1 designates a terminal holder which is fabricated by fitting brass terminal plates 8 in an electrically insulating synthetic resin substrate 2 in such a manner that they are parallel to one another.

Twenty elongated recesses 3 are formed in the bottom of the substrate 2 so as to receive the terminal plates 8. Protrusions 4 are provided in the recesses 3 at certain intervals in such a manner that they extend from one side thereof to the opposite side.

Elongated terminal inserting holes 5 for receiving the male terminals 9 of the terminal plates 8 are formed at positions on the substrate 2 immediately above the protrusions 4.

Coupler fitting parts 6 for receiving couplers 11 are formed on the upper surface of the substrate 2 in such a manner that the coupler fitting parts 6 extend perpendicular to the terminal plates.

Locking shoulders 7 are formed adjacent to the terminal inserting holes 5. When the male terminal 9 of the terminal plate 8 is inserted into the terminal inserting hole 5, a terminal retaining piece 10 protruding from the male terminal 9 is engaged with the locking shoulder 7, so that the terminal plate 8 is positively secured to the substrate 2.

Female terminal inserting holes 12 are formed in each coupler 11 at the same intervals as those of the terminal plates 8. A female terminal is inserted into each wire inserting hole 12.

A locking shoulder 13 is formed in each wire inserting hole 12. When the female terminal 14 is inserted into the wire inserting hole 12, a terminal retaining piece 15 slightly protruding from the female terminal 14 is engaged with the locking shoulder 13, so that the female terminal 14 is positively held in the coupler 11.

Each female terminal 14 has a wire clamping piece 16 at the top, a core wire clamping piece 17 below the wire clamping piece, and a male terminal clamping piece 18 at the bottom. The wire clamping piece 16 and the core wire clamping piece 17 are bent in one direction, so that a wire 22 and its core wire 23 are positively held by the clamping pieces 16 and 17. The male terminal clamping piece 18 is bent in the same direction, so that male terminal 9 is clamped by the male terminal clamping piece 18 at either side.

The central portion 19, in the widthwise direction, of the female terminal 14 is curved in a manner such that it comes near both ends of the male terminal clamping piece 18, and the lower portions of both ends of the male terminal clamping piece 18 are cut and bent. Therefore, when the coupler 11 is inserted into the coupler fitting part 6, the male terminal 9 is smoothly engaged with the female terminal 14, guided by the curved central portion 19 and the lower portions of both ends of the female terminal 14.

The embodiment of the invention shown in FIGS. 2 through 9 is designed as described above. Therefore, when the male terminals of the terminal plates 8 are inserted into the terminal inserting holes 5 of the substrate 2 and each terminal plate is inserted between one side wall of the recess 3 and the protrusions 4, the terminal retaining piece 10 of each terminal plate 8 is locked by the locking shoulder 7, riding over the latter, so that each terminal plate 8 is positively secured to the substrate 2.

The end of a wire 22 extended from a wire harness 21 is inserted into a wire inserting hole 12 of the corresponding coupler 11. Under this condition, the wire 22 is clamped with the wire clamping piece 16, and the wire core 23 exposed from the wire 22 is clamped with the core clamping piece 17, so that the female terminal 14 is connected to the end of the wire 22.

When each female terminal 14 is inserted into the wire inserting hole 12 of the coupler 11 from below, the end of the female terminal retaining piece 15 is locked by the locking shoulder 13 of the coupler 11, riding over the locking shoulder 13, so that the female terminal 14 is positively secured to the coupler 11.

When the coupler 11 is inserted into the coupler fitting part 6 of the substrate 2, the female terminals 14 are brought elastically into contact with the male terminals 9, so that the terminals 9 and 14 are stably electrically connected together.

Figure 9:
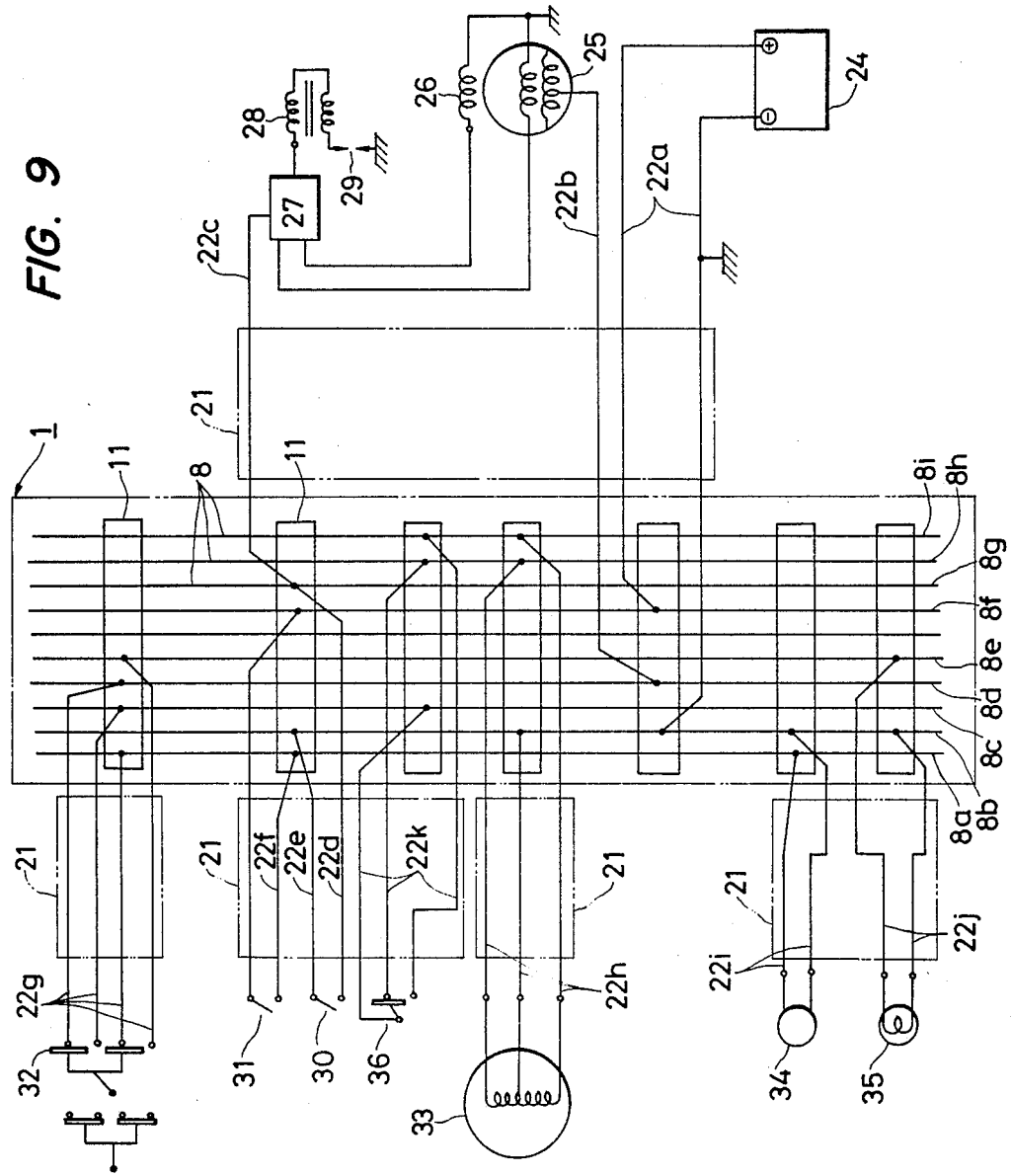
FIG. 9 is an explanatory diagram showing one example of wiring using the coupler connecting device according to the invention.
Figure 10:
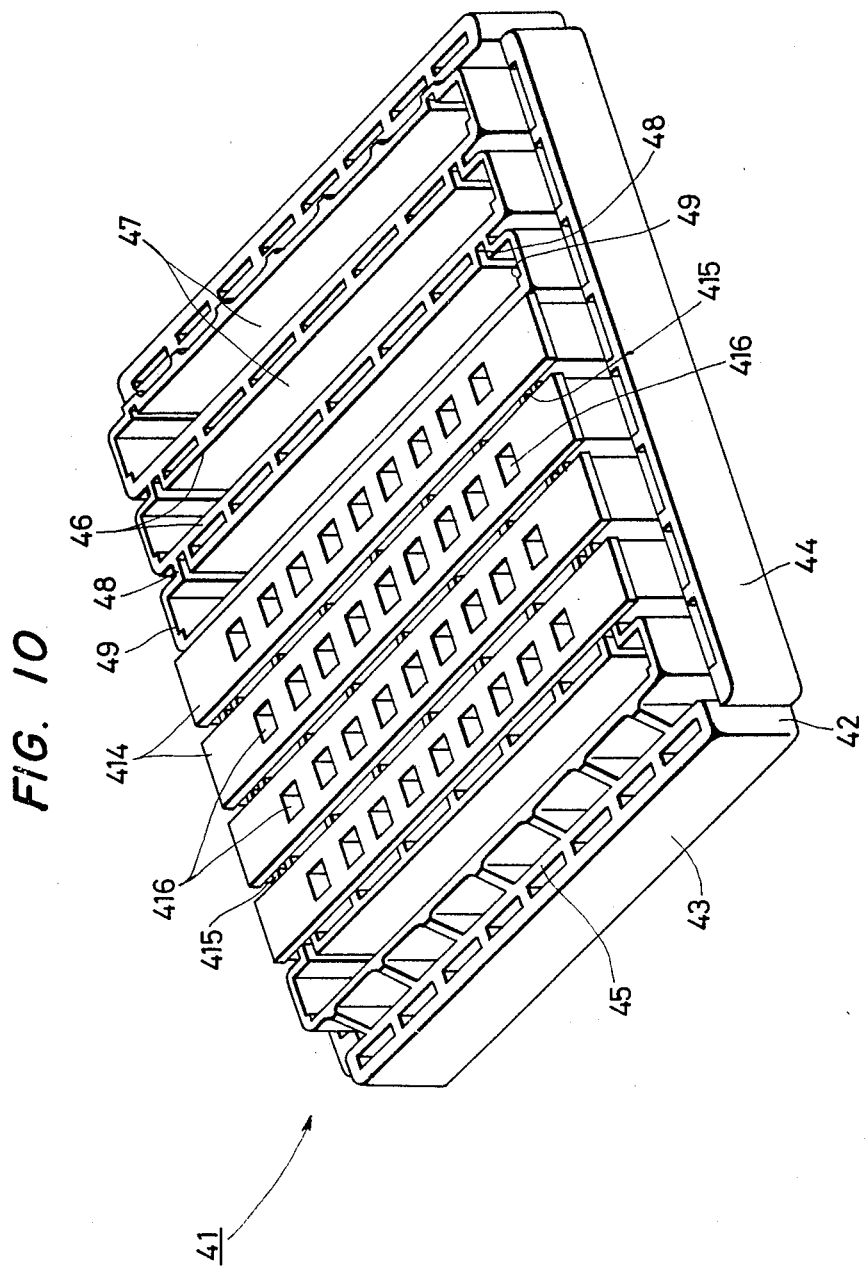
FIG. 10 is an enlarged perspective view showing the essential components of another coupler connecting device.
Figure 11:
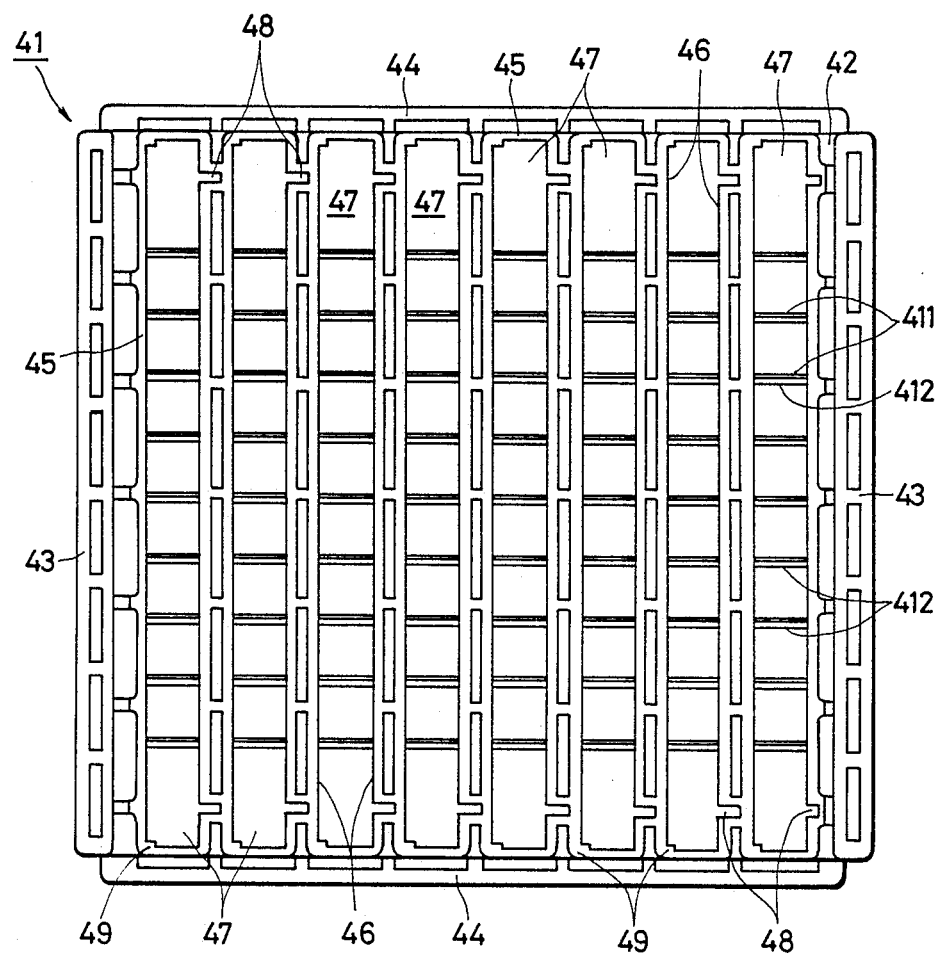
FIG. 11 is a plan view of the device of FIG. 10.

FIG. 9 shows one example of the application of the terminal holder 1 to the electrical system of a motorcycle (FIG. 9 shows only ten terminal plates 8, for simplification in illustration.) A battery 24 is connected through a cord 22a, the female terminals 14 and the male terminals 9 to the terminal plates 8b and 8f.

An AC generator 25 is connected through a cord 22b to the terminal plates 8d (the description of the terminals 14 and 9 being omitted, for simplification in description).

An ignition signal coil 26 connected to the AC generator 25 is connected to a capacitor discharge type ignition unit 27, which is connected through an ignition coil 28 to an ignition plug 29.

The ignition stopping terminal of the capacitor discharge type ignition unit 27 is connected through a wire 22c to the terminal plate 8g, which is connected through a wire 22d to one terminal of ignition stopping switch 30, the other terminal of which is connected through a wire 22e to the terminal plate 8b.

A power switch 31 is connected through a cord 22f to the terminal plates 8a and 8f. A lighting switch 32 is connected through a cord 22g to the terminal plates 8a, 8c, 8d and 8e.

A head light 33 is connected through a cord 22h to the terminals 8b, 8h and 8i. A voltmeter 34 is connected through a cord 22i to the terminal plates 8a and 8b. A meter lamp 35 is connected through a cord 22j to the plates 8b and 8e.

A dimmer switch 36 for controlling the output of the head light 33 is connected through a cord 22k to the terminal plates 8c, 8h and 8i.

When electrical components such as various power sources, switches, lamps and meters are connected to the terminal holder 1 as shown in FIG. 9, they can be connected to one another without using any coupler and special branching means, and the number of wires 22 is minimized. Accordingly, wiring can be achieved at low cost. In addition, the main harness can be made smaller in diameter, thus being preferable as regards layout.

When the wires 22 are correctly inserted into the respective wire inserting holes 12 of the couplers 11 and are connected to the female terminals 14, and the couplers 11 are engaged with the respective coupler fitting parts 6, then all of the electrical components can be connected, correctly with high efficiency.

A second embodiment of this invention will be described with reference to FIGS. 10 through 15.

In these figures, reference numeral 1 designates a terminal holder which is fabricated by embedding a plurality of brass terminal plates 410 in an electrically insulating synthetic resin substrate 2 in such a manner that they are arranged at predetermined intervals and parallel to one another.

Reinforcing pieces 43 and 44 are formed on the periphery of the substrate 2 in such a manner that the parts 42, 43 and 44 are integral. A surrounding wall 45 is integrally formed inside of the reinforcing pieces 43 and 44, and the area defined by the surrounding wall 45 is divided by partition walls 46 into eight coupler fitting parts.

Recesses 48 and shoulders 49 are formed in each coupler fitting part 47, so that couplers 414 (described later) may be fitted in the coupler fitting parts.

Figure 13:
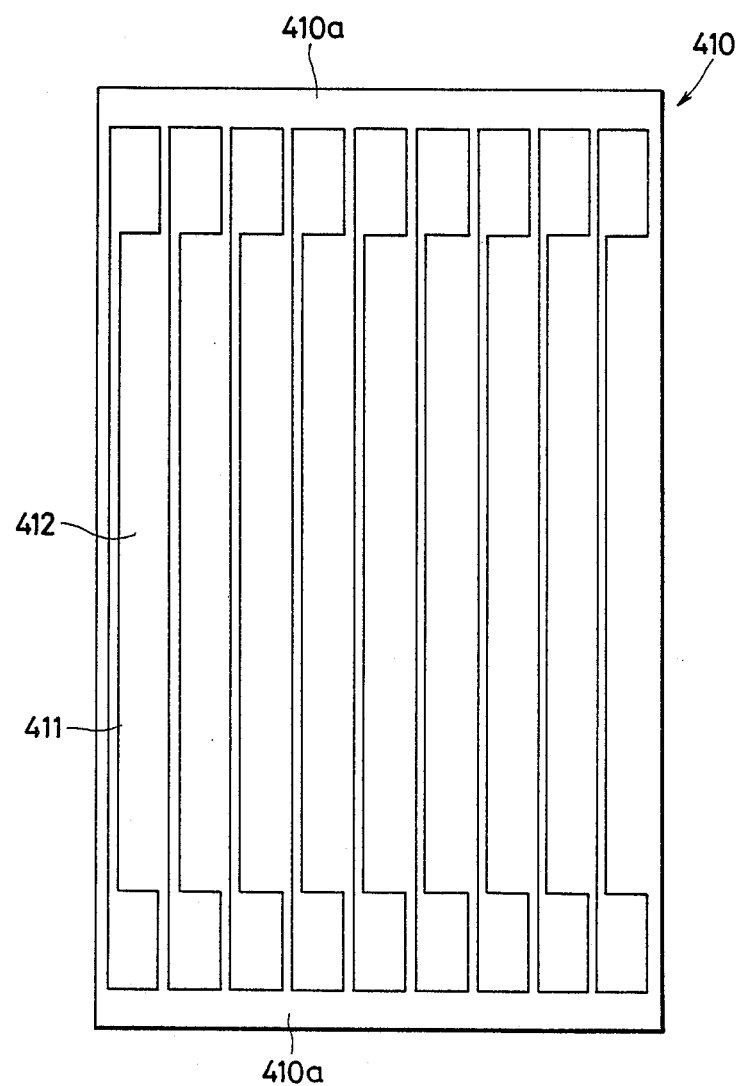
FIG. 13 is a plan view of a blank for a fabricating terminal plates, obtained by pressing.
Figure 14:
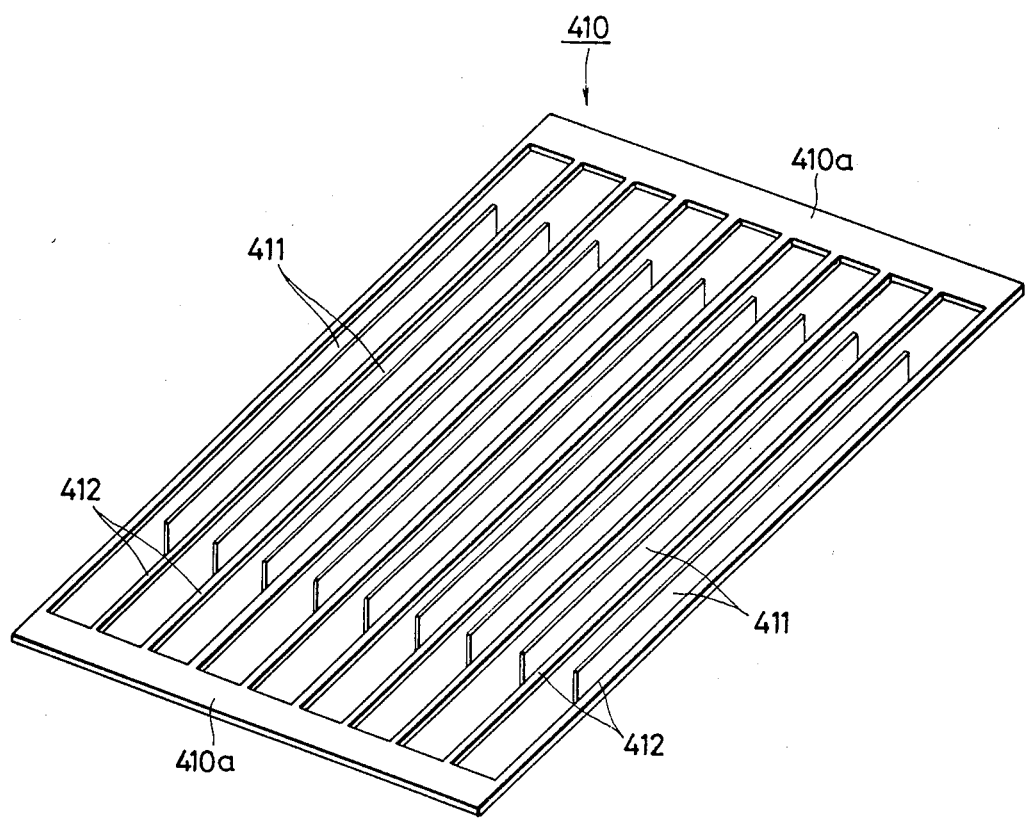
FIG. 14 is a perspective view showing the blank which is bent as required.
Figure 15:
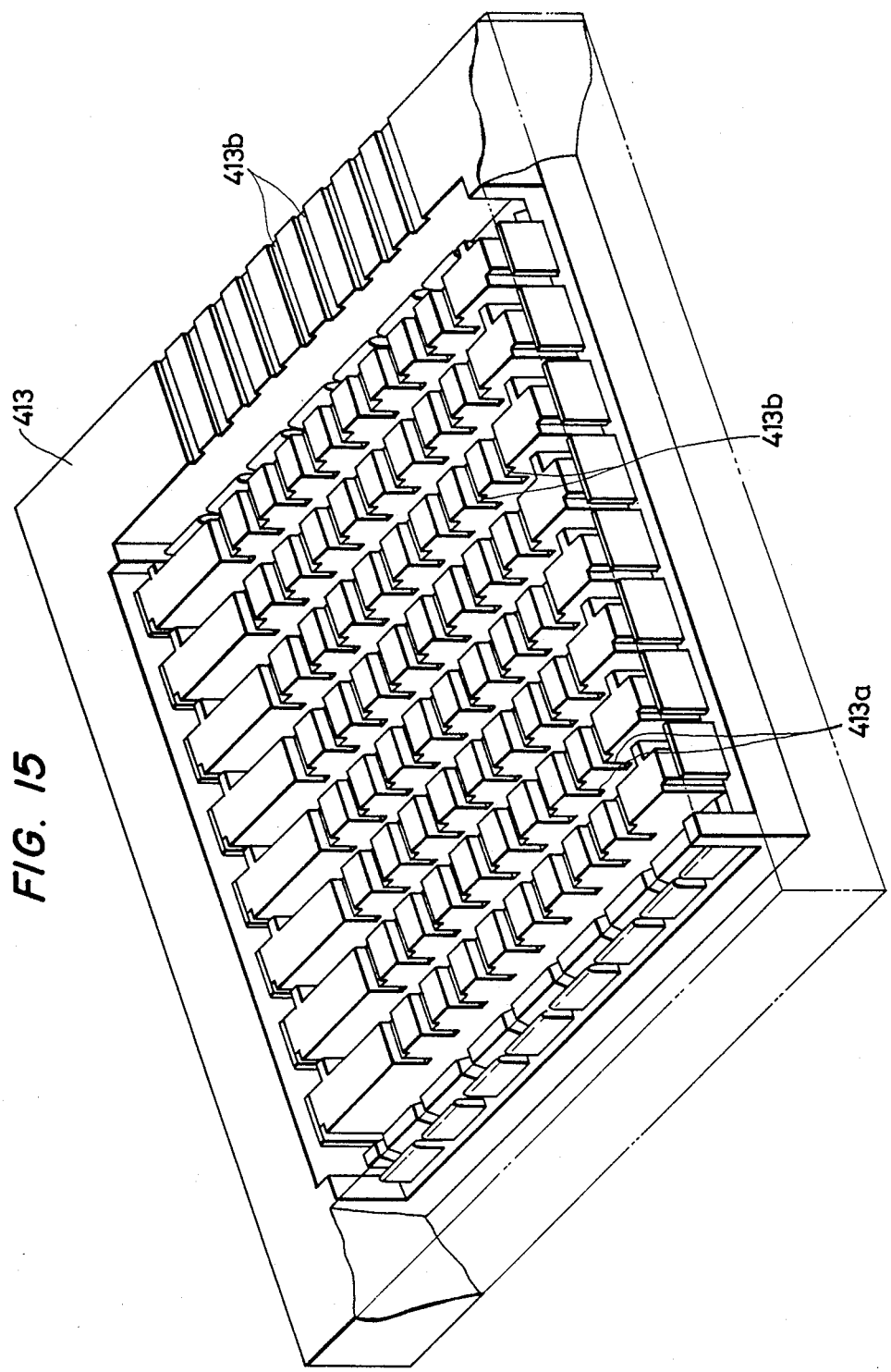
FIG. 15 is a perspective view showing the rear surface of a terminal holder mold.

The above-described terminal holder 1 is manufactured according to the following manufacturing steps:

A blank as shown in FIG. 13 is formed by pressing a brass plate. The blank is bent, to obtain terminal plates 410 as shown in FIG. 14. The flat plate parts 411 and the base parts 412 of the terminal plate 410 are inserted into cuts 413a and 413b formed in a mold 413 shown in FIG. 15, and then a flat cover is placed on the mold. Then, the terminal plate 410 is embedded in the electrically insulating synthetic resin substrate 2, for instance, by extrusion molding, thus forming the terminal holder 1. The portions 410 protruding out of the substrate 2 are cut away.

Protrusions 415 and cuts (not shown) engaged respectively with recesses 48 and the shoulder 49 of each coupler fitting part 47 are formed in the outer wall of each coupler 414.

Wire insertion holes 416 are formed in each coupler 414 at the same intervals as the terminal plate 410, and female terminal inserting holes 417 are formed below the wire insertion holes 416. Furthermore, cuts 418, into which the terminal plates are loosely fitted, are formed in the bottom of the couplers 414. A female terminal 420 is fitted in each female terminal inserting hole 417.

A locking shoulder 419 is formed in each female terminal insertion hole 417. When the female terminal 420 is inserted into the female terminal insertion hole 417, an upraised terminal retaining piece 422 extending from the body 421 of the female terminal 420 is engaged with the locking shoulder 419, so that the female terminal 420 is positively secured to the coupler 414.

The upper portion 421a of the female terminal body 421 is designed so as to clamp the conductor 426 of a wire 425, while the lower portion 421b is designed so as to hold two clamping pieces 423.

The clamping pieces 423 are curved in the form of the letter "U", so that the portions 42a are brought into contact with the sides of the terminal plate 10.

The embodiment shown in FIGS. 10 through 15 is designed as described above. The end of the conductor of a wire 425 which is extended from the wire harness is clamped by the upper portion 421a of the female terminal body 421, and two clamping pieces are held by the lower portion 421b of the female terminal body 421. Under this condition, the female terminal 420 is inserted into the female terminal insertion hole 417 from above. As a result, the end of the terminal retaining piece 422 of the female terminal 420 is engaged with the locking shoulder 419 of the coupler 414, riding over the locking shoulder, so that the female terminal 420 is positively secured to the coupler 414.

When the coupler 414 is fitted in the coupler fitting part 47 of the terminal holder 1, the clamping pieces 423 of the female terminal 420 are elastically brought into contact with the terminal plate 410, so that the two terminals 410 and 420 are stably electrically connected.

The conductors 426 of the necessary wires 425 are selectively connected through the female terminals 420 to nine female terminal insertion holes 417 formed in each coupler 414, and the necessary couplers are inserted into the eight corresponding coupler fitting parts 47 of the terminal holder 1. As a result, the wires connected to the individual couplers are electrically connected through the same terminal plate, which is laid perpendicular to the coupler fitting parts 7.

Accordingly, with the coupler connecting device, thus constructed, the electrical devices on a motorcycle can be connected through switches to the power source.

The terminal plates 410, each being uniform in width, are buried in the substrates 2 in a predetermined positional relation. Therefore, the engaging portion of the terminal plate 410, which is engaged with the female terminal 420 of the coupler 414, is positively secured by the partition walls of the substrates 2 without being elastically deformed. In addition, the terminal plate 410 can sufficiently withstand force applied when the coupler is inserted into the coupler fitting part, and accordingly the coupler can be readily engaged with and disengaged from the coupler fitting part 47.

As described above, the terminal plates 410 are buried in the terminal holder 1 by extrusion-molding, and thereafter both ends 410a of the brass plate 410 are cut off. Accordingly, the time and labor in mounting the terminal plates on the terminal holder 1 can be eliminated, which improves productivity.

This invention also relates to a device for mounting a coupler box adapted to connect the cords of the electrical components of a motorcycle.

In a conventional motorcycle, couplers are connected to the cords through which the electrical components and the power source are connected. Accordingly, in order to repair or replace the electrical components, it is necessary to separate the couplers. The couplers are installed in the head light and connected to the wires. Accordingly, it is necessary for the head light to have a space large enough to receive the couplers.

With advancements, the number of electrical components has increased, and accordingly the number of couplers has made it necessary to increase the volume of the head light casing, which affects the arrangement of the head light and that of other components around the head light. In addition, increasing the volume of the head light casing is not preferable from the point of view of external appearance.

According to the invention, the coupler box is separated from the head light, so that the head light can be reduced in dimension and can be set closer to its relevant components.

An embodiment achieving this end will now be described with reference to FIGS. 16 through 21.

In these figures, reference numeral 51 designates a pair of fork pipes. The fork pipes 51 are connected through a top bridge 52 to each other at the upper ends thereof, and are further connected through a bottom bridge 53 located below the top bridge 52. A handle shaft (not shown) is fixedly secured to the centers of the bridges 52, 53, and is rotatably inserted into a head pipe 54.

A meter 55 is installed on the top bridge 52. A head light 56 is coupled to a head light bracket 57 which is mounted on the top bridge 52.

A protrusion 53a extends from the front end of the bottom bridge 53. An equalizer 58 is mounted on the portrusion 53a with bolts 59. A pair of horn brackets 510 are fastened to the equalizer 58 with bolts 511 in such a manner that they extend to the right and left, respectively.

Two horns 512 are secured to the ends of the horn brackets 510, respectively.

Coupler box mounting brackets 515, to which a coupler box 513 is secured through a mounting piece 513a with bolts 514, are fastened to the bottom bridge 53 in such a manner that they stand between the pair of fork pipes 51, behind the horns 512 and right below the head light 56.

An engaging protrusion 515a protrudes from the lower portion of each coupler box mounting bracket 515, and an engaging protrusion is secured to the upper portion of the bracket 515 with a small screw 517.

The coupler box 513 has a cover 518 of resin. Engaging pieces 519 with engaging recesses 519a are formed on the lower portion of the inner surface of the cover 518, and engaging grooves 520 are formed in the upper portion.

The engaging pieces 519 of the cover 518 are engaged with the engaging protrusions 515a of the coupler box mounting brackets 515, and the engaging grooves 520 of of the cover 518 are engaged with the engaging protrusions 516 of the brackets 515. That is, the cover 518 is detachably engaged with the coupler box mounting brackets 515 to cover the couplerbox 513.

Figure 20:
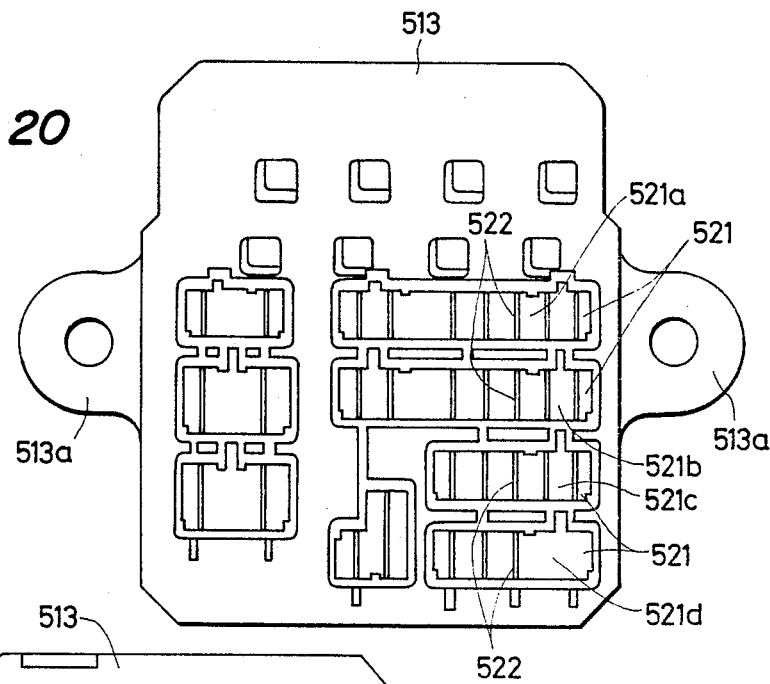
FIG. 20 is a front view of a coupler box mounted with the coupler box mounting device.
Figure 21:
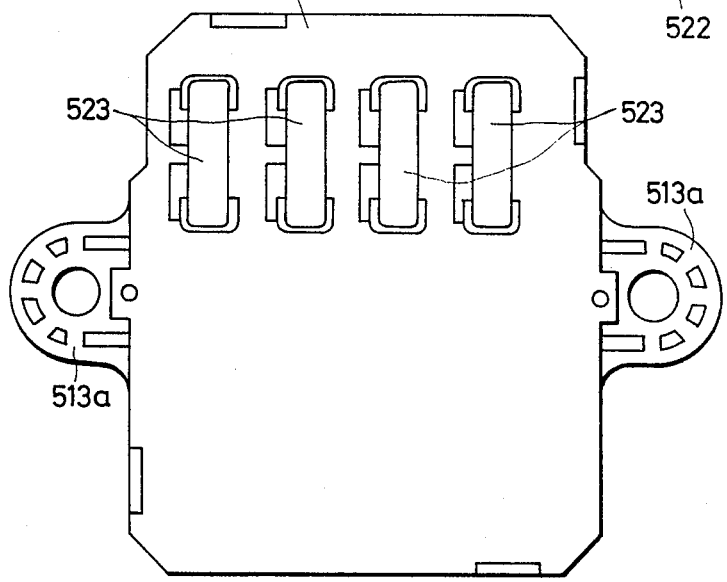
FIG. 21 is a rear view of the device of FIG. 20.
Figure 19:
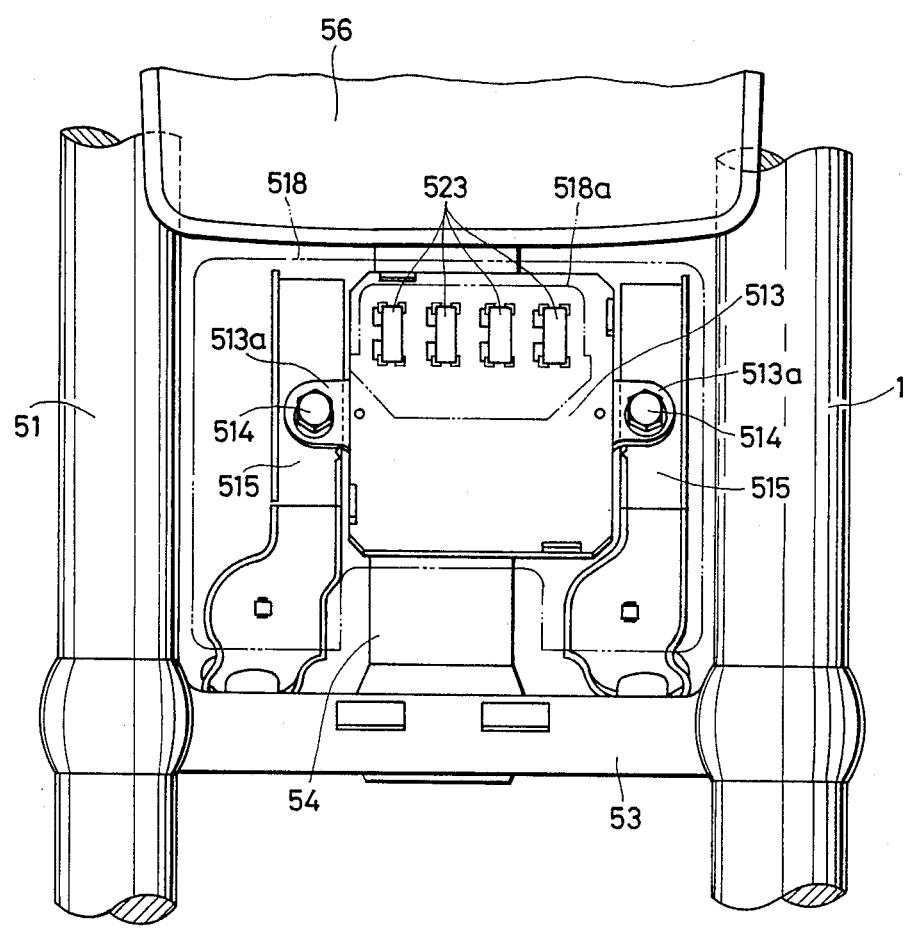
FIG. 19 is a front view showing the essential components of the coupler box mounting device.

The coupler box 513, as shown in FIGS. 20 and 21, has connectors 521 for connecting a main electrical circuit to branch circuits. The connector 521a is connected to a starter switch, the connector 521b to the main harness, the connector 521c to a blinker switch, and the connector 521d to meters. The conducting plates 522 of the connectors 521a through 521d are arranged in lines and are connected to one another at the bottoms.

Fuses 523 are mounted on the rear surface of the coupler box 513, and are connected to the connectors 521a through 521d, respectively, so that current is applied through the fuses 523 to the loads (or the starter switch, main harness, blinker switch and meters.) Water removing holes may be provided on the front surface of the coupler box 513 upwardly from the rear toward the position corresponding to the fuses 523.

Figure 16:
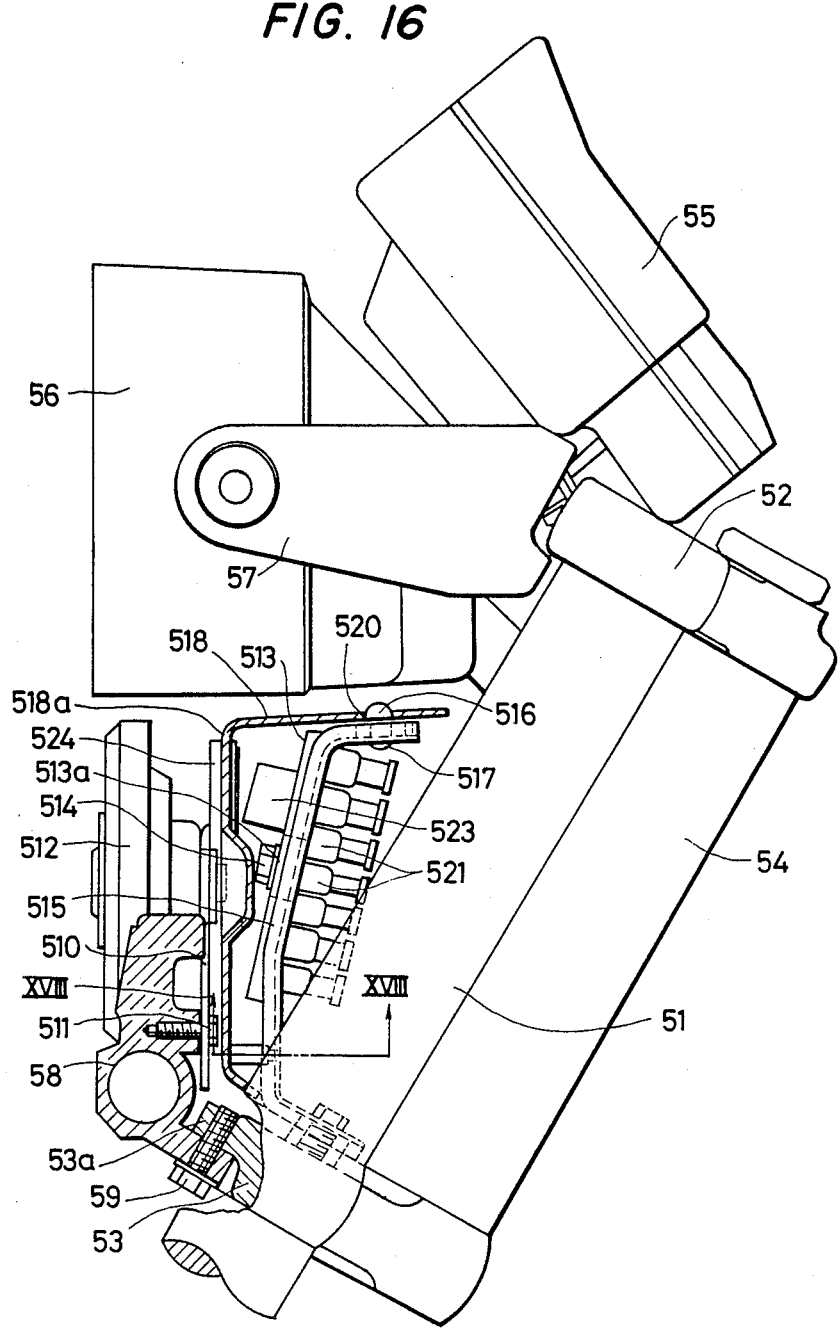
FIG. 16 is a side view showing one example of a coupler box mounting device installed on a motorcycle.
Figure 17:
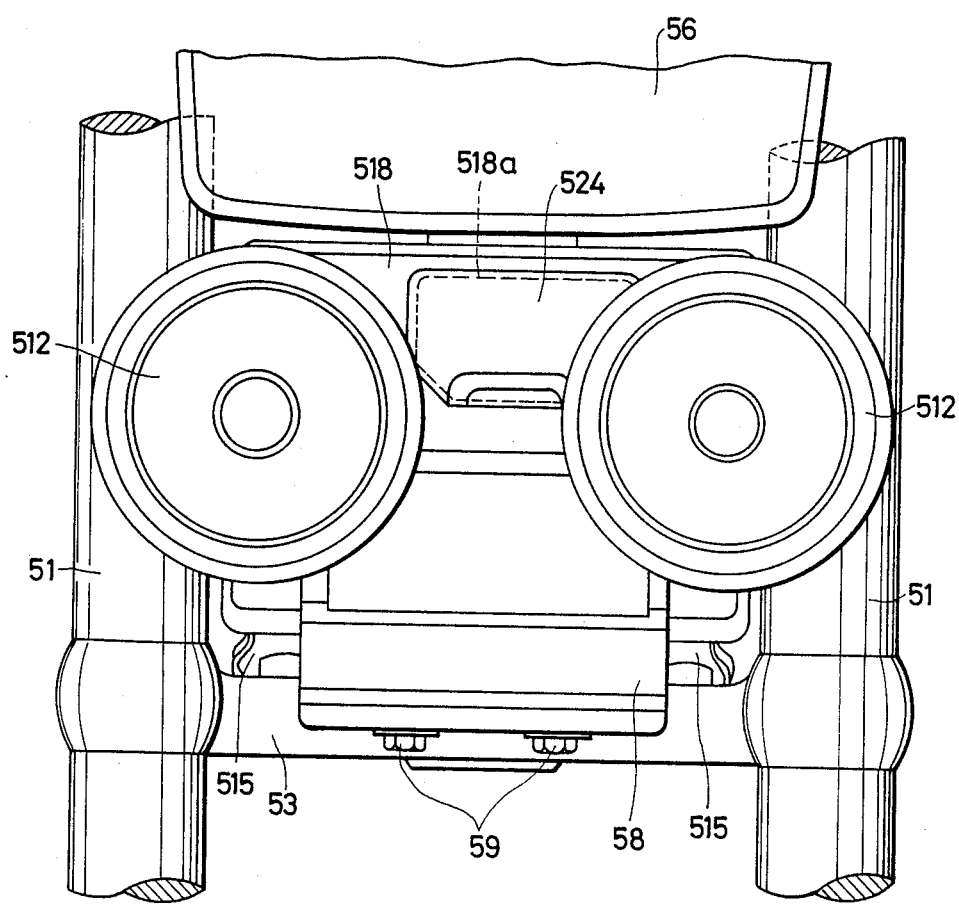
FIG. 17 is a front view of the device of FIG. 16.
Figure 18:
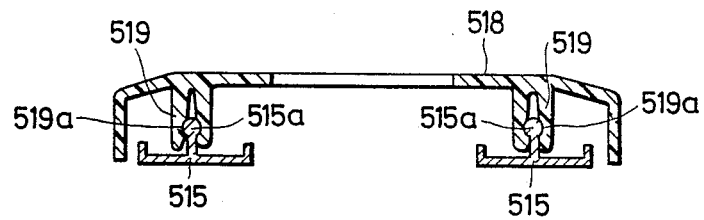
FIG. 18 is a sectional view taken along line XVIII—XVIII of FIG. 16.

An inspecting window 518a is formed in the cover 518 of the coupler box 518, as shown in FIGS. 16 and 17. The inspecting window 518a confronts with the fuses 523 on the coupler box 513. A cover 524 is fitted in the inspecting window 518a. Thus, in order to inspect or replace the fuses 523, it is necessary to remove the cover 524.

According to the embodiment shown in FIGS. 16 through 21, the coupler box 513 is separated from head light 56. Accordingly, the head light 56 can be miniaturized, which makes it possible to set components such as the meter 55 and the horns 512 closer to the head light. This contributes not only to an improvement in the degree of freedom in layout, but also to an improvement of the appearance of the head light and its relevant components.

In this embodiment, the coupler box 513 is set in a space which has not been utilized heretofore; that is, in the space below the head lights 56 and between the pair of fork pipes 51. Thus, in the invention, the available space on the motorcycle is effectively utilized.

Furthermore in this embodiment, the cover 518 has an inspecting window 518a which is confronted with the fuses 523 mounted on the coupler box 513. Therefore, with the cover 524 removed, the fuses 523 can be readily inspected and replaced through the inspecting window 518a. That is, maintenance of the fuses can be readily achieved.

According to this embodiment, the coupler box comprising the fuses and the couplers is arranged below the head light and between the right and left front forks, which makes it posssible to reduce the size of the head light and to set other components closer to the head light. As a result, the degree of freedom in layout and the appearance are improved.

For the same reason, space is effectively utilized. Moreover, the coupler box is covered with a cover member, and the latter has its own cover which is detachably set in a manner such as to confront the fuses. Inspection and replacement of the fuses, i.e., maintenance of the fuses, can thus be readily achieved.

Figure 22:
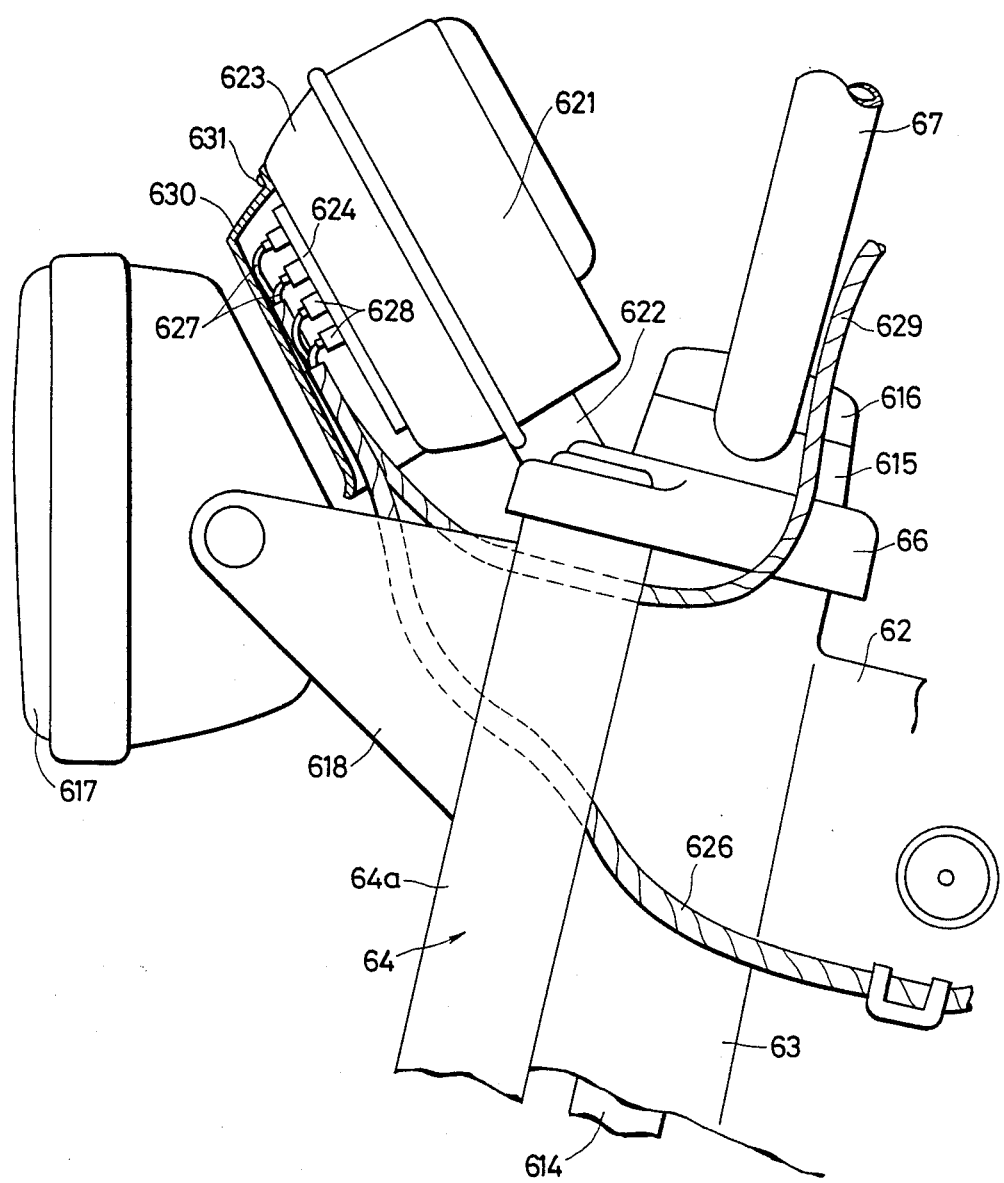
FIG. 22 is an enlarged view, with parts cut away, showing the front part of the motorcycle.

FIGS. 21 through 25 illustrate a further embodiment in detail. As shown in FIG. 22, front fork upper members 64a are connected through the top bridge 66 to each other, the upper end of a steering stem 614 which is inserted into the head tube 63 is secured to the top bridge 66, and the lower end of the steering stem 614 which is inserted into the head tube 63 is secured to the top bridge 66, and the lower end of the steering stem 614 and the middle parts of the upper members 64a are coupled to a bottom bridge (not shown). A handle bracket part 615 is raised from the middle part of the top bridge 66. A handle 67 is set on the handle bracket 615, and is fixedly set by securing a handle bracket part 616 on the lower handle bracket 615.

A head light unit 617 is set in front of the top bridge. In this embodiment, brackets 618 extend from the upper parts of the front fork upper members 64a, and both sides of the head light unit 617 are coupled to the front ends of the brackets 618. In this embodiment, blinkers are provided at the right and left sides of the head light unit, and a horn is installed on the front part of the frame. Operating switches for these electrical devices are provided on the grips of the handle 67.

Figure 23:
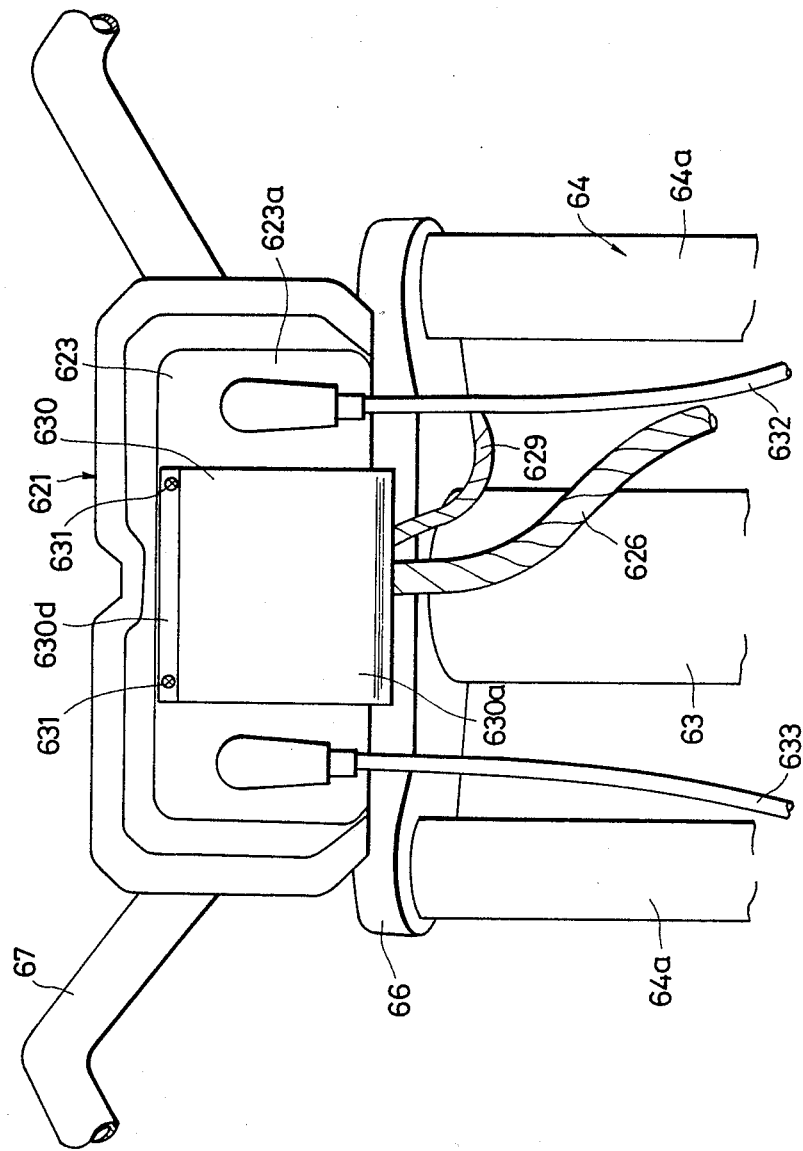
FIG. 23 is a rear view of a meter unit.
Figure 24:
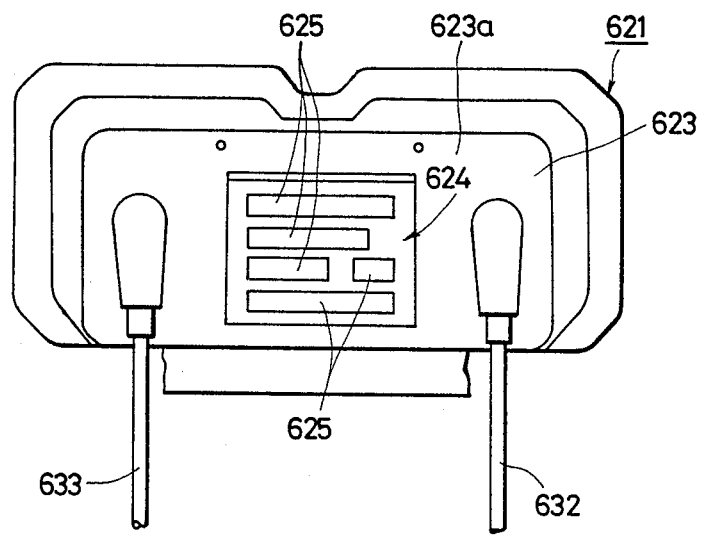
FIG. 24 is a rear view of the meter unit in FIG. 23 from which the cover is removed.

A meter unit 621 is mounted through a bracket 622 on the front part of the top bridge 66. The meter unit 621, as shown in FIGS. 23 and 24, is substantially in the form of a horizontally extended rectangle. The figures show the side of the meter unit, and the rear surface of the meter unit which is opposite to the front display surface. The meter unit has a speedometer, a tachometer, a hydraulic pressure gauge and other metering and display elements.

Concentrated couplers 624 with female sockets 625 are set on the rear surface of the casing 623 of the meter unit 621, i.e., on the surface 623a which is tilted forwardly of the motorcycle and confronted with the rear surface of the casing of the head light unit 617. The female sockets 625 are directed towards the front part of the motorcycle from above. The terminal in each socket 625 is electrically connected to a male coupler which is connected to a wire 627 to a harness 626 which is extended along the frame 62 from the power source. On the other hand, a harness from the blinkers 619, the head light unit 617 and the horn 620 is connected through male couplers to the socket 625, and harness 629 from the switches on the handles is similarly connected through male couplers to the sockets 625. Wiring the various meters and display elements of the meter unit 621 may be substantially unnecessary or may be extremely short because the couplers 624 are installed on the rear surface of the casing 623.

Figure 25:
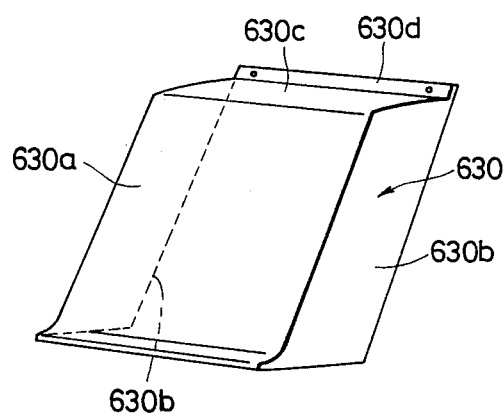
FIG. 25 is a perspective view of the cover.

The couplers 624 are covered with a cover 630 at the front, right and left, and above. The cover 30 is as shown in FIG. 25. The body 630a of the cover has side pieces 630b and 630b at both sides, and a top piece 630c at the top, both edges of the top piece 630c merging with the upper edges of the side pieces 630b and 630b. The height of the side pieces 630b, or the top piece 630c, is slightly larger than the sum of the heights of the curved harness or single-wires extending from the male couplers 628 which are engaged with the female couplers 624. The top piece 630c has a mounting flange 630d at the edge. The cover 630, which is designed as described above, is placed over the concentrated couplers 624, and is then secured to the rear surface 623a of the casing 623 with screws 631, in a manner such as to form an opening at the bottom. The harnesses are extended through the opening thus formed. The length of the cover body 630a is much larger than that of the coupler 624; that is, the cover body 630a extends to the lower end of the casing 623. Thus, the couplers 624 and the connections of the harness 626 are covered at the front, right and left, and above; that is, the connections of the harness are sufficiently covered by the cover. FIGS. 22 and 23 show the meter unit on which the cover 630 has been installed, and FIG. 24 shows the meter unit from which the cover 630 has been removed.

The effects of the embodiment will now be described. The concentrated coupler is set on the rear surface of the meter unit, and the harness from the electrical devices on the front part of the motorcycle and the harness from the power source are connected to the couplers. Thus, the couplers are arranged reasonably, utilizing the existing meter unit. The couplers and the connections of the harnesses are covered with the cover which is opened downwardly but is suficiently long. Therefore, entrance of water from below is effectively prevented; that is, the device of the invention is excellent in water-proofing during running in rain. The cover is long and is open downwardly for installation of the harnesses, and provides a water-proof effect, as described above. The cover, being simple in construction, can be installed readily, which is advantageous in maintenance. As the concentrated couplers are installed on the rear surface of the meter unit, inspection can be readily achieved with the cover removed. This eliminates the troublesome work of opening the casing of the head light, and then inserting the hand thereinto. As the flat female coupler is set on the flat rear surface of the meter unit, maintenance can be readily achieved. Since the coupler is installed on the meter unit, the head light, being free from the coupler, enjoys freedom of design; that is, the head light can be designated as desired. These effects or merits of the invention should be highly appreciated.

According to a further embodiment of the invention, a head light unit 715 is provided in front of the top bridge, and brackets 716 are extended from the upper portions of the front fork upper members 74a, and both sides of the head light unit 715 are fastened to the front ends of the brackets 716. Blinkers are set at the right and left sides of the head light unit and below the latter, and a horn is installed on the front part of the frame. Operating switches for the electrical components are provided near the grips of the handlebar 78.

A meter unit 720 is mounted through a stay 719 on the front part of the top bridge 77, in such a manner that the display surface 720a thereof is directed obliquely and backwardly. In this embodiment, the meter unit has meters 721 such as a speedometer and a tachometer at the right and left sides, an oil pressure gauge 722 at the middle, blinker turn signal displaying elements 723 on both sides of the gauge 722, a high beam/low beam display element 724, a speed change gear shift position display element 725, and an ignition switch 726.

Figure 26:
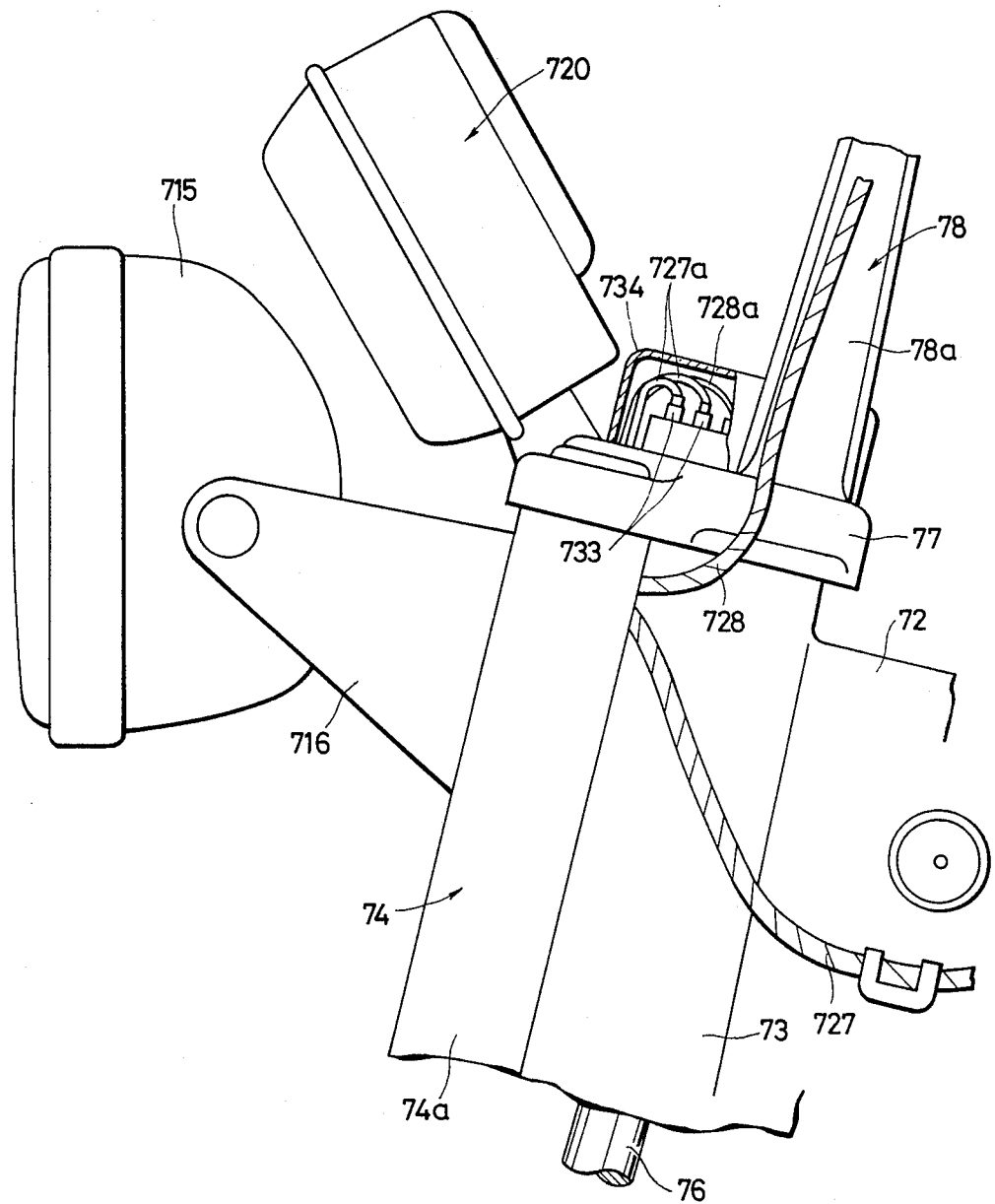
FIG. 26 is a side view of the front of a motorcycle.

The wires of a harness 727 from the battery are connected to the above-described head light unit, blinkers, horn and meter unit, and a harness 728 on the handle 78 is connected thereto. The connection of these harnesses will be described with reference to FIGS. 26 and 27.

The right and left portions of the top bridge 77 are coupled to the bosses 78b of the right and left handlebar members 78a, respectively. The middle portion of the upper surface 77a of the top bridge 77 is a flat mounting surface. A concentrated coupler 729 is set on the middle portion 77b, and its substrate 730 is fixedly secured to the top bridge middle portion 77b with its bosses 730a secured thereto with screws. A plurality of female sockets 731, which are essential components of the coupler, are arranged on the substrate 730. The sockets 731 are each in the form of a hole which is open in the upper surface 730b. The sockets 731 are arranged in front and middle parts 730c of the substrate. Electrical elements 732 such as fuses, relays, diodes and ICs are arranged in the rear part 730d of the substrate 730.

The harnesses 727 and 728 are laid below the top bridge 77 and pulled forwardly. Then, the wires of the harnesses 727 and 728 are extended between the front part of the top bridge 77 and the meter unit 720 to the coupler 729. Male terminals 733 connected to the ends of the these wires are engaged with the respective sockets 731. In this case, the wires 727a and 728a of the harnesses are extended to the front and middle part 730c of the substrate 730 of the concentrated coupler 729, and the rear part 730d of the substrate 730 is free from the harnesses. The concentrated coupler 729 is covered with a cover 734 for water-proofing.

The effects of this embodiment will now be described. Maintenance of the harnesses and electrical elements, i.e., removal, installation, inspection and replacement thereof can be performed with the cover 734 removed. Maintenance can be readily achieved because it is performed at the middle of the top bridge. The harnesses of the electrical elements and the connecting couplers are collectively arranged, and the fuses and other elements are also collectively arranged at the same position. Accordingly, inspection, replacement, removal and installation can be readily achieved. As the couplers and the electrical elements are collectively arranged, it is unnecessary to provide a plurality of boxes or arranging means at a plurality of positions. For the same reason, the number of mounting bases may be only one, and accordingly the base is installed at only one position, which contributes to a reduction of the number of components and to a simplification in design. The central part of the top bridge is effectively utilized according to this embodiment. The concentrated coupler itself can be readily mounted on the top bridge, which facilitates the manufacturing efficiency of the motorcycle. As the harnesses are coupled to the front part of the substrate, the electrical elements on the rear part of the substrate are free from the harnesses although they are collectively arranged. Accordingly, the fuses and other elements can be replaced without removing the harnesses from the sockets. This is considerably advantageous in terms of maintenance. The harnesses are laid between the front end of the top bridge and the meter unit, not appearing on the side of the top bridge. This is effective in improving the external appearance.

As was described above, the coupler connecting device according to the invention comprises a terminal holder having a plurality of terminal plates with a plurality of terminals, which are provided on a substrate in a manner such that they are arranged at predetermined intervals in the widthwise direction and are in parallel with one another; and couplers which are arranged perpendicular to the longitudinal direction of the terminal plates, so as to be selectively connected to the plurality of terminals. Accordingly, if necessary electrical parts are connected through wires to the respective terminals of the couplers, and the couplers are engaged with the terminal holder, then the required electrical circuits can be correctly completed with considerably high efficiency.

As is apparent from the above description, in the coupler connecting device comprising a terminal holder which is fabricated by providing a plurality of terminal plates on an insulating substrate in a manner such that they are arranged at predetermined intervals in the widthwise direction thereof and in parallel with one another; and couplers which are set perpendicular to the longitudinal direction of the terminal plates, so as to be selectively connected to the terminal plates, according to the invention, the plurality of terminal plates are buried in the insulating substrate. Accordingly, a number of terminal plates can be correctly set by only one molding operation, which contributes to an improvement in productivity.

In the coupler connecting device according to the invention, the terminal plates have no cuts; that is, they are each in the form of one plate, and are buried in the insulating substrate. Accordingly, the terminal plates are high in strength and rigidity, and the couplers can be readily engaged with or disengaged from the terminal holder.

What is claimed is:

1. In a two wheeled vehicle, a device for selectively connecting electrical elements of said two wheeled vehicle to a power source of said two wheeled vehicle, said device comprising power source wires, one end of said power source wires being connected to said power source, electrical element wires, one end of said electrical element wires being selectively connected to said electrical elements, and a terminal holder (1) interposed between said power source wires and said electrical element wires for connecting the other ends of said power source wires to the other ends of said electrical element wires, said terminal holder (1) comprising:
   a substrate (2) having at least a length and a width;
   a plurality of linear metal terminal plates (8), each of said plates having a length, width and depth, said length and width of each terminal plate defining a rectangular shape, said plurality of terminal plates being arranged in said substrate at predetermined intervals across substantially the entire widthwise direction of said substrate and in parallel with one another, the lengths of all of said plates parallel to the length of said substrate extending across the entire length of said substrate;
   a plurality of terminals (9) attached to the depth portion of each of said terminal plates; and
   a plurality of coupler fitting parts (6) for receiving couplers (11), said coupler fitting parts (6) being arranged perpendicular to the longitudinal direction of said terminal plates (8) and parallel to one another, each of said terminal plates (8) extending, without interruption, across all of said plurality of coupler fitting parts;
   said coupler fitting parts (6) having a commonly shaped inner surface and one key grooved side in the widthwise direction for preventing incorrect mating of a coupler fitting part with a coupler, there being contained within each of said coupler fitting parts a predetermined number of said terminals (9);
   whereby a coupler can be mated with any of the coupler fitting parts and the same electrical interconnection will result.

2. A device as claimed in claim 1, wherein said terminal plates are fitted in recesses in said holder.

3. A device as claimed in claim 1, including locking means for retaining said terminals in said coupler fitting parts.

4. A device as claimed in claim 3, said locking means including locking shoulders for retaining terminals inserted into insertion holes of said holder.

* * * * *